(No Model.) 2 Sheets—Sheet 2.

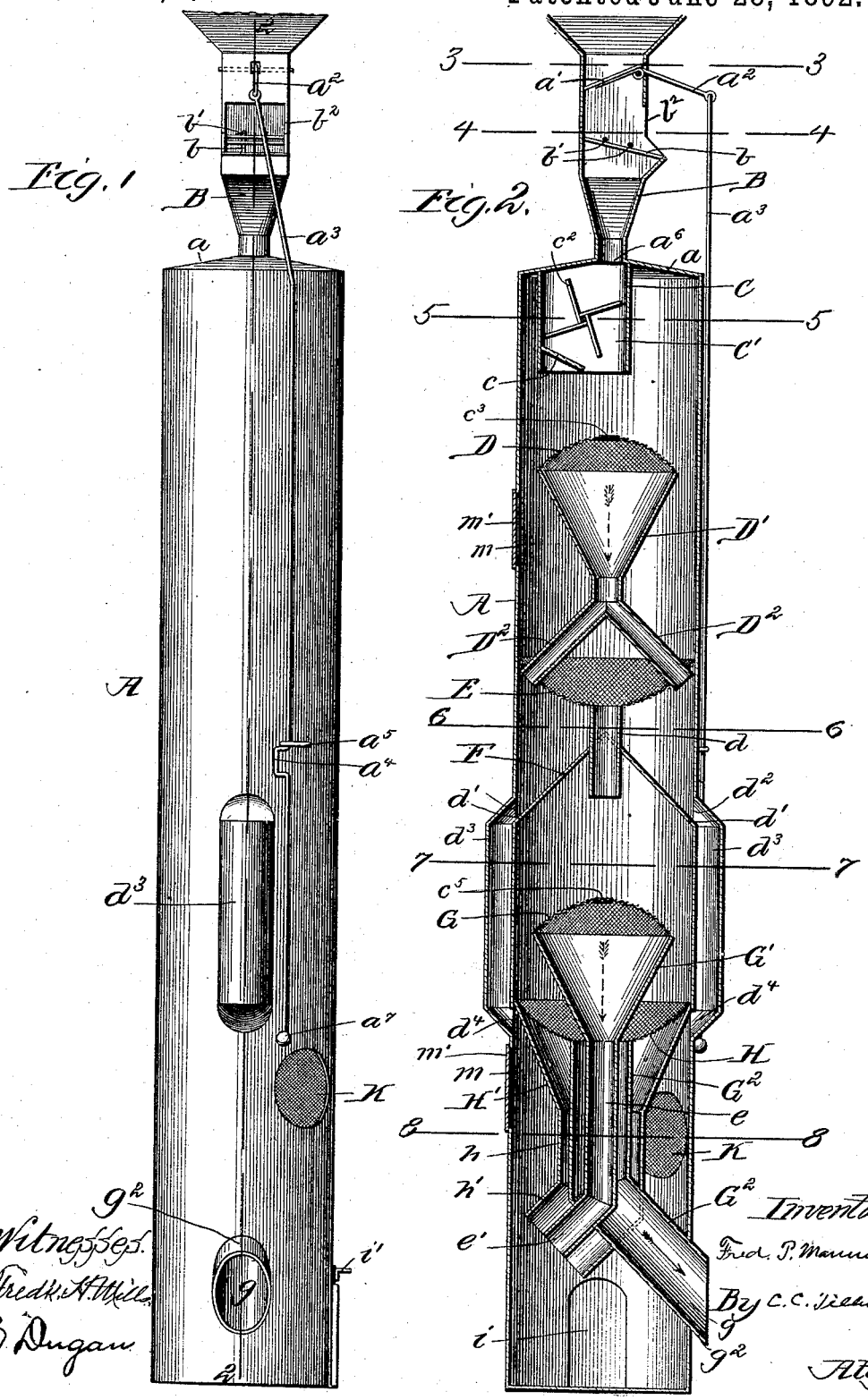

F. P. MANNING.
GRAIN PURIFIER.

No. 477,668. Patented June 28, 1892.

Witnesses:
Fred. H. Miles.
E. Dugan.

Inventor
Fred. P. Manning
By Chas. C. Tillman
Atty.

THE NORRIS PETERS CO., PHOTO-LITHO., WASHINGTON, D. C.

UNITED STATES PATENT OFFICE.

FRED P. MANNING, OF TURNER, ILLINOIS.

GRAIN-PURIFIER.

SPECIFICATION forming part of Letters Patent No. 477,668, dated June 28, 1892.

Application filed February 5, 1892. Serial No. 420,402. (No model.)

*To all whom it may concern:*

Be it known that I, FRED P. MANNING, a citizen of the United States, residing at Turner, in the county of Du Page and State of Illinois, have invented certain new and useful Improvements in Grain-Purifiers, of which the following is a specification.

My invention relates to improvements in devices for purifying grain or for separating therefrom dust, weed-seeds, and other deleterious particles, and while it is adapted to be used for purifying almost any kind of grain, yet it is especially designed to be used for cleansing oats to render the same more wholesome as a food for horses; and it consists in certain peculiarities of construction and novel arrangement and operation of the various parts thereof, as will be hereinafter more fully set forth, and specifically claimed.

The object of my invention is to provide a purifier for the above-named purpose which shall be strong and durable, simple and effective in operation, yet inexpensive in construction.

In order to enable others skilled in the art to which my invention pertains to make and use the same, I will now proceed to describe it, referring to the accompanying drawings, in which—

Figure 3:
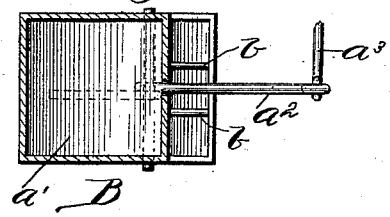
Figure 4:
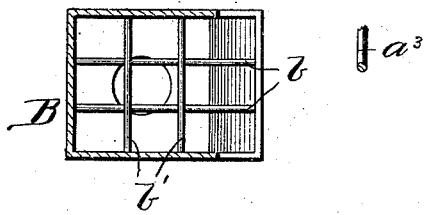
Figure 5:
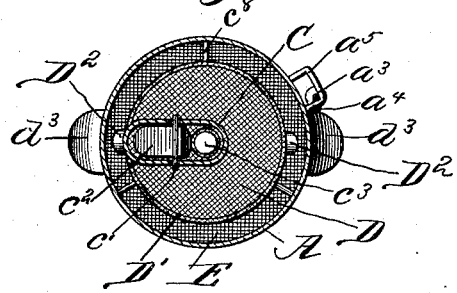
Figure 6:
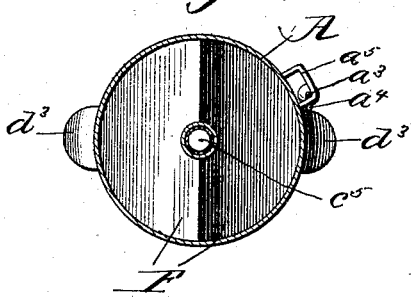
Figure 7:
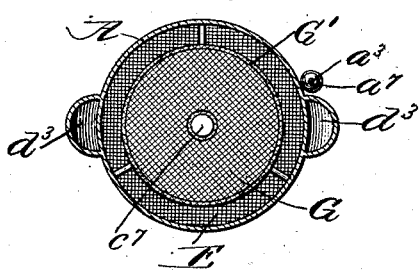
Figure 8:
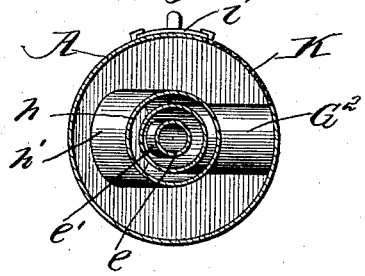

Figure 1 is a view in side elevation of my device as it appears when ready for use. Fig. 2 is a vertical sectional view thereof taken on line 2 2 of Fig. 1. Fig. 3 is a cross-section taken on line 3 3 of Fig. 2. Fig. 4 is a similar view taken on line 4 4 of Fig. 2. Fig. 5 is a like view taken on line 5 5 of Fig. 2. Fig. 6 is a view in cross-section taken on line 6 6 of Fig. 2. Fig. 7 is a similar view taken on line 7 7 of Fig. 2, and Fig. 8 is a view in cross-section taken on line 8 8 of Fig 2.

Similar letters refer to like parts throughout the different views of the drawings.

A represents the casing, which may be made of any suitable material and of any desired size and form, but preferably cylindrical, as shown in the drawings. The upper portion of this casing is closed with a top $a$, to which is secured and opens into the casing a receiving-spout B, which may be connected to a chute leading from the bin or other receptacle for the grain.

Near the top and within the cavity of the receiving-spout B is movably secured a trap-door $a'$ to regulate and control the quantity of grain admitted to the casing. This trap-door is made of proper size and form to fit within the cavity of the receiving-spout and is secured to a lever $a^2$, which lever is fulcrumed in any desired manner to the surface of the receiving-spout, as shown in the drawings, and connects with the operating-rod $a^3$, which extends downward, and is provided at a suitable point with a crook $a^4$ to engage with a bracket $a^5$, secured to the outer surface of the casing A, and thus serves to hold the trap-door open and to admit the grain. To close the said door and shut off the flow of the grain to the casing, it is only necessary to disengage the crook $a^4$ from the bracket, when the weight $a^7$ on the rod will automatically close the trap-door, the weight $a^7$ on the lower end of the rod being regulated or of the proper gravity to automatically control the quantity admitted, thus preventing the spout becoming choked.

About midway between the trap-door $a'$ and the opening $a^6$ into the upper part of the casing the receiving-spout B is provided with an inclined floor $b$, composed of wire rods $b'$, which may be laid crosswise of each other, as shown in Fig. 4, or may extend parallel with each other, inclining from the rear of the spout B to the front thereof, so that the straws which it is designed to catch will be thrown out through the opening $b^2$ in the front of the spout B. As shown in Figs. 1 and 2 of the drawings, the spout B tapers toward its lower portion and opens into the top of the casing A, as shown at $a^6$.

Beneath the opening and secured to the lower surface of the top $a$ and within the cylinder A is secured a sleeve C, which is preferably made oblong in cross-section, as shown in Fig. 5, and has at its bottom an inclined floor $c$, which extends forward to about the middle of the lower part of the sleeve, thus leaving about one-half of said lower part of the sleeve open and directly over the center of the convexed sieve D. Within the sleeve C, upon a suitable axle $c'$, having it bearings in the sides of the sleeve C to the rear of the opening $a^6$, is mounted a revoluble fan $C'$, having a number of blades or leaves $c^2$.

At a suitable point below the lower end of the sleeve C and within the casing A and secured to the sides thereof by means of brace-rods $c^8$ or otherwise is a convexed sieve D, preferably made of wire cloth or netting having at its center a smooth-faced disk $c^7$.

To the periphery of the convexed sieve D, which is held by the rods $c^8$, a slight distance from the inner surface of the casing A, is secured a funnel D', preferably made of sheet metal or other smooth-surfaced material, which extends downward, as shown in Fig. 2 of the drawings, and terminates into bifurcated ends $D^2$, which extend toward the surface of the casing A and pass through a concave or funnel-shaped sieve E, which has its edges or periphery secured to the inner surface of the casing and is provided at its center with a neck or spout $d$, which passes through the apex of a substantially A-shaped roof F, which is made of sheet metal or other smooth-surfaced material and has its lower extremities $d'$ formed trough-shaped and secured to the inner surface of the casing A, which casing is at these points provided with openings $d^2$, which unite with tubes $d^3$, secured usually to the outer surface of the casing A, and extend vertically therewith to a proper point and open into the casing A, as at $d^4$.

At a suitable point below the roof or inclined floor F and within the casing A is located a convexed sieve G, preferably made of wire cloth or netting and provided at its center with a disk $c^5$, which has a smooth surface.

As shown in Fig. 2, the periphery or edge of the sieve G is at a slight distance from the inner surface of the casing A and is secured to a funnel G', preferably made of sheet metal or other material having a smooth surface, which funnel has a downwardly-extending neck $e$, the lower end of which is deflected and passes through an opening in the grain channel or pipe $G^2$, as shown at $e'$.

Around the funnel G' and the upper portion of the neck $e$ thereof is placed a concaved sieve H, which has its edges secured to the casing A at a point just above the openings $d^4$, connecting with the tubes $d^3$. To the outer edge of the sieve H is secured a funnel H', made of material having a smooth surface, which funnel has a neck $h$, deflected at its lower portion, as shown at $h'$, in the direction of the deflection of the neck $e'$ of the funnel G', as is clearly seen in Fig. 2.

To the inner edge of the funnel H is secured a pipe $G^2$, which encompasses the neck $e$ of the funnel G' and passes through an opening in the neck $h$ of the funnel H' in an opposite direction from the deflection $h'$, and out through an opening $g$ in the casing A, there terminating into a spout $g^2$, from which the purified grain is received into bags or other suitable receptacles.

By reference to Fig. 2 it will be seen that the dust, weed-seeds, and other particles which have been separated from the grain will be discharged from the pipes $e$ and $h$ and tubes $d^3$ into the lower portion of the casing A and there confined or retained until it is desired to remove it, which can be done through an opening $i$, having a door $i'$ in the lower part of the casing.

Just below the concave sieve H and upper portion of the funnel H', I provide the casing A with an opening $k$, which is covered with wire cloth or netting and acts as an air-vent.

As it may sometimes be necessary to remove pieces of straw or other matter from the interior of the device, I form at suitable points in the casing a number of hand-holes $m$, with doors $m'$ for closing them.

While I have shown in the drawings the casing A made in the form of a continuous cylinder, yet it is evident that for convenience I may make it in sections.

The operation of my purifier is simple and as follows: The grain is admitted to the receiving-spout B from the chute of a bin or hopper or otherwise by engaging the crook $a^4$ of the operating-rod $a^3$ with the bracket or catch $a^5$, which opens the trap-door. The grain then passes down the spout B through the floor $b$, which removes the straw and chaff, into the sleeve C, where it strikes the blades $c^2$ of the fan C', which is thereby set in motion and fans the dust, chaff, weed-seeds, &c., from the grain and allows the bulk of it to fall upon the smooth-faced disk $c^3$ of the sieve D, thus causing the grain to spread and glide over said sieve, dropping from its edges to the concave sieve E, and from thence through the pipe $d$ to the disk $c^5$ on the sieve G, from the edges of which it falls into the sieve H and out through the pipe $G^2$ and spout $g$, as indicated by the continuous-lined arrows. It will therefore be understood that the dust, seed, &c., will pass through the meshes of the sieves D, E, and G and be conveyed, as indicated by the dotted-lined arrows, by the pipes $D^2$, $d^3$, and $h$ to the bottom of the casing.

In order to regulate the capacity of the purifier I, may increase or diminish the number of sieves in the case A and may use only one each of the concave and convex sieves, or more, if desired.

Having thus fully described my invention, what I claim as new, and desire to secure by Letters Patent, is—

1. In a grain-purifier, the combination of a casing adapted to receive the grain at its upper portion and provided with an outlet therefor in its lower part, with a revoluble fan located beneath the receiving-opening within the casing, and a series of convexed sieves having funnels secured to their edges or periphery located one above the other within the casing, and a series of concaved sieves having pipes for the separate conveyance of the dust and grain, located within the casing one above the other and around the necks of the funnels of the convexed sieves, substantially as and for the purpose set forth.

2. In a grain-purifier, the combination of a casing having an opening at its top to receive the grain and openings at its bottom for the removal of dust and discharge of grain, with a receiving-spout secured at its top, having a trap-door to control the flow of grain, the convexed sieve D, having the funnel D', having the bifurcated ends D², the concave sieve E, having the pipe $d$, the inclined floor F, the tubes $d^3$, the convexed sieve G, having the funnel G', grain channel or pipe G², and spout $g^2$, and the concave sieve H, having the funnel H', having the neck $h$, all constructed, arranged, and operating substantially as and for the purpose set forth.

3. In a grain-purifier, the combination of a casing having an opening at its top to receive the grain and openings at its bottom for the removal of dust and discharge of grain, with a receiving-spout B, secured to the top of the casing and having a trap-door to control the flow of grain, the sleeve C, having the floor $c$, the revoluble fan C', the convex sieve D, having the funnel D', having the bifurcated ends D², the concave sieve E, having the pipe $d$, the inclined floor F, the tubes $d^3$, the convex sieve G, having the funnel G' and grain channel or pipe G², and the concave sieve H, having the funnel H', having the neck $h$, all constructed, arranged, and operating substantially as and for the purpose set forth.

4. In a grain-purifier, the combination of the casing A, having the openings $m, k, i$, and $a^6$, and the bracket $a^5$, with the receiving-spout B, having the trap-door $a'$ and lever $a^2$, the opening $b^2$ and floor $b$, the operating-rod $a^3$, having the crook $a^4$ and weight $a^7$, the sleeve C, having the floor $c$ and fan C', the convex sieve D, having the funnel D', having the bifurcated ends D², the concave sieve E, having the pipe $d$, the inclined floor F, the tubes $d^3$, the convex sieve G, having the funnel G' and grain channel or pipe G², and the concave sieve H, having the funnel H', having the neck $h$, all constructed, arranged, and operating substantially as shown and described, and for the purpose set forth.

5. In a grain-purifier, the combination of the casing A, having the openings $m, k, i$, and $a^6$, and the bracket or catch $a^5$, with the receiving-spout B, having the trap-door $a'$ and lever $a^2$, the opening $b^2$ and floor $b$, the operating-rod $a^3$, having the crook $a^4$ and weight $a^7$, the sleeve C, having the revoluble fan C', the convex sieve D, having the disk $c^3$, and funnel D', having the bifurcated ends D², the concave sieve E, having the pipe $d$, the inclined floor F, the tubes $d^3$, the convex sieve G, having the disk $c^5$, the funnel G', and grain channel or pipe G², and the concave sieve H, having the funnel H', having the neck $h$, all constructed, arranged, and operating substantially as shown and described, and for the purpose set forth.

FRED P. MANNING.

Witnesses:
CHAS. C. TILLMAN,
E. DUGAN.